United States Patent
Schaefer

(10) Patent No.: US 11,453,378 B2
(45) Date of Patent: Sep. 27, 2022

(54) METHOD FOR CONTROLLING A DRIVE TRAIN OF A HYBRID VEHICLE

(71) Applicant: VOLKSWAGEN AKTIENGESELLSCHAFT, Wolfsburg (DE)

(72) Inventor: Stephan Schaefer, Velpke (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 231 days.

(21) Appl. No.: 16/772,325

(22) PCT Filed: Nov. 29, 2018

(86) PCT No.: PCT/EP2018/083053
§ 371 (c)(1),
(2) Date: Jun. 12, 2020

(87) PCT Pub. No.: WO2019/115247
PCT Pub. Date: Jun. 20, 2019

(65) Prior Publication Data
US 2021/0086746 A1  Mar. 25, 2021

(30) Foreign Application Priority Data
Dec. 12, 2017 (DE) .............. 102017222535

(51) Int. Cl.
*B60W 20/00* (2016.01)
*B60K 6/36* (2007.10)
(Continued)

(52) U.S. Cl.
CPC ............ *B60W 20/00* (2013.01); *B60K 6/36* (2013.01); *B60K 6/383* (2013.01); *B60K 6/387* (2013.01);
(Continued)

(58) Field of Classification Search
None
See application file for complete search history.

(56) References Cited

U.S. PATENT DOCUMENTS

| 5,562,565 A | 10/1996 | Moroto et al. |
| 5,655,990 A | 8/1997 | Ooyama et al. |

(Continued)

FOREIGN PATENT DOCUMENTS

| DE | 19532129 A1 | 3/1997 |
| DE | 10133695 A1 | 3/2002 |

(Continued)

*Primary Examiner* — Dirk Wright
(74) *Attorney, Agent, or Firm* — Laurence A. Greenberg; Werner H. Stemer; Ralph E. Locher

(57) ABSTRACT

A method for controlling a drive train of a hybrid vehicle which includes an internal combustion engine, an electric machine that is operated as a motor or generator, and a transmission. Energy is recovered in the overrun operation of the vehicle by operating the electric machine in generator mode. The transmission has at least one free-wheel-connected low forward gear that only transmits traction torque, and at least one free-wheel-free high forward gear. When the free-wheel-connected low forward gear is engaged and the vehicle transitions into the overrun operation, or the driver requests a transition into the overrun operation by selecting the free-wheel-connected low forward gear, an overrun torque is set via the free-wheel-free high forward gear by a (Continued)

generator operation of the electric machine for energy recovery. The overrun torque thereby substantially corresponds to an overrun torque of a free-wheel-free configuration of the free-wheel-connected low forward gear.

10 Claims, 1 Drawing Sheet

(51) Int. Cl.
    *B60K 6/383*     (2007.10)
    *B60K 6/387*     (2007.10)
    *B60K 6/48*     (2007.10)
    *B60K 6/547*     (2007.10)
    *B60W 10/02*     (2006.01)
    *B60W 10/06*     (2006.01)
    *F16H 3/10*     (2006.01)

(52) U.S. Cl.
    CPC ............... *B60K 6/48* (2013.01); *B60K 6/547* (2013.01); *B60W 10/02* (2013.01); *B60W 10/06* (2013.01); *F16H 3/10* (2013.01); *B60K 2006/4825* (2013.01); *B60W 2710/021* (2013.01); *B60W 2710/0644* (2013.01); *B60Y 2200/92* (2013.01); *B60Y 2400/427* (2013.01)

(56) References Cited

U.S. PATENT DOCUMENTS

| | | |
|---|---|---|
| 6,487,998 B1 | 12/2002 | Masbert et al. |
| 6,939,265 B2 | 9/2005 | Rustige et al. |
| 7,093,511 B2 | 8/2006 | Norum et al. |
| 10,166,974 B2 | 1/2019 | Kumazaki et al. |
| 2003/0217876 A1 | 11/2003 | Severinsky et al. |
| 2014/0033844 A1* | 2/2014 | Rothvoss ................. F16H 3/16 |
| | | 74/335 |
| 2015/0176682 A1 | 6/2015 | Ruehle et al. |

FOREIGN PATENT DOCUMENTS

| | | | |
|---|---|---|---|
| DE | 10221701 A1 | 11/2002 | |
| DE | 102014109776 A1 * | 1/2016 | ............... B60K 1/00 |
| DE | 102014116412 A1 * | 5/2016 | ............... F16H 3/10 |
| DE | 102016124262 A1 | 6/2017 | |
| DE | 102016204581 A1 * | 9/2017 | ............... B60K 6/36 |
| EP | 2696104 A2 * | 2/2014 | ......... F16D 25/0638 |
| EP | 2696104 A2 | 2/2014 | |
| EP | 2886383 A2 * | 6/2015 | ............. B60K 6/383 |
| EP | 2886383 A2 | 6/2015 | |

\* cited by examiner

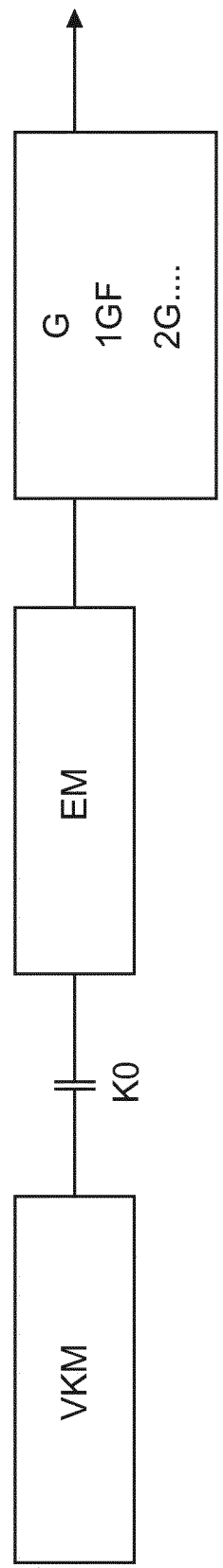

METHOD FOR CONTROLLING A DRIVE TRAIN OF A HYBRID VEHICLE

BACKGROUND OF THE INVENTION

Field of the Invention

The invention relates to a method for controlling a drive train of a hybrid vehicle having the features as claimed.

The drive train in hybrid vehicles comprises an internal combustion engine and an electric motor. In addition, the drive train of hybrid vehicles may have a transmission.

EP 2 931 546 B1 discloses a method for controlling a drive train which comprises an internal combustion engine, an electric motor that can be operated as a motor and as a generator, and an automatic transmission.

The methods known in the prior art for controlling drive trains of hybrid vehicles are not yet of optimal design, however. In addition, methods for controlling drive trains are usually heavily dependent on the configuration of the drive train, for example on the layout of the internal combustion engine, the electric motor and the transmission in respect of one another, and also on the configuration thereof, and they cannot usually be transferred to differently configured drive trains. Moreover, drive trains known in the prior art are usually complex, costly, and/or demanding in terms of space.

SUMMARY OF THE INVENTION

The problem addressed by the invention is therefore that of configuring and developing the method referred to above for controlling a drive train of a hybrid vehicle in such a manner that the drive train can be produced and operated simply, efficiently, cost-effectively and/or in a space-saving manner.

The problem underlying the invention is solved by a method for controlling a drive train of a hybrid vehicle as claimed. In this case, the drive train comprises an internal combustion engine, an electric motor that can be operated as a motor and as a generator, and a transmission. In this case, energy can be recovered when the vehicle is in overrun operation by the electric motor operating as a generator.

The transmission in this case particularly comprises at least one freewheel-connected low forward gear that only transmits traction torque and at least one freewheel-free higher forward gear. In particular, the freewheel-connected low forward gear may be the first forward gear and the freewheel-free higher forward gear may be the second forward gear of the transmission.

The transmission may, in particular, be an automatic transmission, for example an automatic and/or automated transmission. For example, the transmission may be a transmission configured as an automated manual transmission in which gear changes, in particular, can be actuated or performed manually by the driver of the vehicle through a one-touch mode. In this case, a transmission configured as an automated manual transmission may, in particular, be understood to mean a transmission with an automated clutch which can be actuated or controlled particularly through manual actuation, in particular a "one-touch mode" in the passenger compartment (without a clutch pedal having to be actuated and/or be present in the passenger compartment). A transmission that can be actuated by a one-touch mode may, in particular, be understood to mean a transmission in which a series gear change, for example from the first to second forward gear, and/or from the second to third forward gear, can be actuated through manual touching of an actuating element by the driver of the vehicle.

In the method, in particular when the freewheel-connected low, in particular first, forward gear is engaged and the vehicle transitions into overrun operation, or when the driver of the vehicle requests a transition of the vehicle into overrun operation by selecting the freewheel-connected low, in particular first, forward gear, an overrun torque can be set via the freewheel-free higher, in particular second, forward gear by the electric motor operating as a generator in order to recover energy, which overrun torque corresponds, in particular substantially, to an overrun torque of a freewheel-free embodiment of the freewheel-connected low, in particular first, forward gear.

In this case, "substantially" can be understood to mean that the overrun torque that has been set lies within a range of 90% to 110% of the overrun torque of a freewheel-free embodiment of the freewheel-connected low, in particular first, forward gear.

By using a freewheel that only transmits traction torque, in particular in the function of an overrunning clutch, as the shift element of a lower forward gear, for example of the first forward gear, the transmission and therefore the drive train can be produced in a simpler, more cost-effective and/or space-saving manner and the production thereof can therefore be optimized. For example, through the use of a freewheel that only transmits traction torque for the shifting of a gear equipped therewith of a gear selector actuating mechanism, for example a sliding sleeve, a gearshift fork (1/N), a valve, a piston, a directional sensor, and/or a housing bore can be dispensed with.

However, no thrust can be transmitted by a freewheel-connected forward gear that only transmits traction torque. On the one hand, therefore, the freewheel-connected low, for example first, forward gear cannot be used when the electric motor operates as a generator and therefore, in particular, not for the recovery of energy by the electric motor. On the other hand, unlike in the case of conventional vehicles, no braking effect (engine brake) can take place in the freewheel-connected low, for example first, forward gear when the vehicle is in overrun operation, which could possibly confuse the driver of the vehicle.

The fact that via the freewheel-free higher, for example second, forward gear an overrun torque is set when the electric motor is in generator operation for energy recovery, which overrun torque corresponds, in particular substantially, to an overrun torque of a freewheel-free embodiment of the freewheel-connected low forward gear, means not only that energy can be recovered but, in particular, the driver can also be given a similar impression to that of driving a conventional vehicle, namely the feeling that the low, for example first, forward gear selected is furthermore engaged and, in particular, a braking effect (similar to the traditional engine brake) is created and conveyed and driver confusion is thereby avoided.

The method is particularly advantageous when the transmission is embodied as an automated manual transmission, in particular one that can be actuated by one-touch mode, since in this case overrun operation of the vehicle in the freewheel-connected low, for example first, forward gear can not only occur when the driver releases the gas when driving in the freewheel-connected low, for example first, forward gear, but in particular also when the driver requests a transition of the vehicle into overrun operation by selecting the freewheel-connected low, in particular first, forward gear, in particular starting from a freewheel-free higher, for example second, forward gear. Since in this case the driver expects a braking effect corresponding to the low, for example first, forward gear selected and could become confused if this effect were not to materialize, conveying a similar impression to that of driving a conventional vehicle, namely the feeling that the low, for example first, forward gear that has been selected is, or remains, engaged and, in particular, creates a braking effect (similar to the traditional engine brake) is of particular importance in this case.

In one embodiment, when the vehicle transitions into overrun operation in the freewheel-connected low, in particular first, forward gear, there is a shift into the freewheel-free higher, in particular second, forward gear and an overrun torque is set via the freewheel-free higher, in particular second, forward gear by the electric motor operating as a generator in order to recover energy, which overrun torque corresponds, in particular substantially, to an overrun torque of a freewheel-free embodiment of the freewheel-connected low, in particular first, forward gear.

In an alternative or additional further embodiment, when the driver of the vehicle requests a transition of the vehicle into overrun operation by selecting the freewheel-connected low, in particular first, forward gear, the freewheel-free higher, in particular second, forward gear is retained and an overrun torque is set via the freewheel-free higher, in particular second, forward gear by the electric motor operating as a generator in order to recover energy, which overrun torque corresponds, in particular substantially, to an overrun torque of a freewheel-free embodiment of the freewheel-connected low, in particular first, forward gear.

In a further embodiment, when an overrun torque is set via the freewheel-free higher, in particular second, forward gear by the electric motor operating as a generator in order to recover energy, which overrun torque corresponds, in particular substantially, to an overrun torque of a freewheel-free embodiment of the freewheel-connected low, in particular first, forward gear, the freewheel-connected low, in particular first, forward gear is displayed as the target gear. This means that confusion on the part of the driver due to a change in display can be avoided.

In a further embodiment, when the vehicle changes from overrun operation back into traction operation, for example because the driver presses the gas pedal, there is a shift from the freewheel-free higher, in particular second, forward gear into the freewheel-connected low, in particular first, forward gear. Insofar as this takes place while the hybrid vehicle is in electric motor operation, this gear change is hardly noticeable to the driver and therefore does not cause any driver confusion either.

Furthermore, the drive train may, for example, have a clutch, for example a so-called K0 clutch, between the internal combustion engine and the electric motor.

In a further embodiment, when the vehicle is being operated by the internal combustion engine, said internal combustion engine is decoupled and/or switched off by opening the clutch during the setting of the overrun torque via the freewheel-free higher, in particular second, forward gear by the electric motor operating as a generator in order to recover energy, and/or coupled and/or started again when the vehicle changes from overrun operation to traction operation by closing the clutch. In this way, the recovery of energy by the electric motor operating as a generator can be improved.

In a special embodiment, when the vehicle is being operated by the internal combustion engine, said internal combustion engine is switched off by opening the clutch during the setting of the overrun torque via the freewheel-free higher, in particular second, forward gear by the electric motor operating as a generator in order to recover energy and/or started again when the vehicle changes from overrun operation to traction operation.

In another special embodiment, when the vehicle is being operated by the internal combustion engine, said internal combustion engine continues to be operated during the setting of the overrun torque via the freewheel-free higher, in particular second, forward gear by the electric motor operating as a generator in order to recover energy and is decoupled by opening the clutch and/or coupled when the vehicle changes from overrun operation to traction operation by closing the clutch again. In this way, a high vehicle dynamic can be represented.

The speed of the internal combustion engine can in particular be held and/or set at a speed corresponding to the freewheel-connected low, in particular first, forward gear when the vehicle is being operated by the internal combustion engine during the setting of the overrun torque via the freewheel-free higher, in particular second, forward gear by the electric motor operating as a generator in order to recover energy and/or when the vehicle is changed from overrun operation to traction operation. It is thereby possible to avoid driver confusion due to the change of speed.

The transmission may, in particular, be configured as an automatic or automated dual-clutch transmission. For example, the transmission may be a dual-clutch transmission with a first partial transmission that can be coupled via a first transmission clutch and a second partial transmission that can be coupled via a second transmission clutch. In this case, the freewheel-connected low, in particular first, forward gear that only transmits traction torque can be assigned to the first partial transmission and/or coupled via the first transmission clutch. The freewheel-free higher, in particular second, forward gear in this case may, in particular, be assigned to the second partial transmission and/or coupled via the second transmission clutch.

In a further embodiment, when the freewheel-connected low, in particular first, forward gear is selected and/or shifted, in addition to the freewheel-connected low, in particular first, forward gear, the freewheel-free higher, in particular second, forward gear is engaged beforehand. This may, in particular, be realized in an embodiment of the transmission as a dual-clutch transmission. In this way, shifting noises can be minimized and driver confusion avoided.

The disadvantages referred to above are therefore avoided and corresponding advantages are achieved.

There exist a plurality of possible ways of advantageously configuring and developing the method according to the invention for controlling a drive train of a hybrid vehicle. For this purpose, reference can initially be made to the dependent patent claims. A small number of preferred embodiments of the inventive method for controlling a drive train of a hybrid vehicle are explained in greater detail below with the help of the drawing and the associated description.

BRIEF DESCRIPTION OF THE DRAWING

The FIGURE of the drawing shows in a schematic representation an embodiment of a drive train for a hybrid vehicle which can be controlled by a method according to the invention.

DETAILED DESCRIPTION OF THE INVENTION

The FIGURE shows that the drive train for a hybrid vehicle comprises an internal combustion engine VKM, a transmission G, and an electric motor EM. In this case, energy can be recovered when the vehicle is in overrun operation by the electric motor EM operating as a generator. The electric motor EM is arranged between the internal combustion engine VKM and the transmission G in the embodiment shown. The transmission G in particular comprises at least one freewheel-connected low forward gear 1GF that only transmits traction torque and a freewheel-free higher forward gear 2G. The freewheel-connected low forward gear 1GF that only transmits traction torque may, in this case, be the first forward gear of the transmission G and the freewheel-free higher forward gear 2G the second forward gear of the transmission G in particular. The transmission G may, for example, be a transmission configured as an automated manual transmission, in particular wherein the gear change can be actuated or realized manually by the driver of the vehicle by a one-touch mode. In particular, the transmission G has a plurality of forward gears, for example five or six forward gears, the transmission may, in particular, be configured as a dual-clutch transmission.

A drive train of this kind may be controlled by the method according to invention in such a matter that when the freewheel-connected low forward gear 1GF is engaged and the vehicle transitions into overrun operation or when the driver of the vehicle requests a transition of the vehicle into overrun operation by selecting the freewheel-connected low forward gear 1GF, an overrun torque is set via the freewheel-free higher forward gear 2G by the electric motor EM operating as a generator in order to recover energy, which overrun torque corresponds substantially to an overrun torque of a freewheel-free embodiment of the freewheel-connected low forward gear 1GF. If the vehicle changes from overrun operation back into traction operation, there can be a shift from the freewheel-free higher forward gear 2G into the freewheel-connected low forward gear 1GF.

The FIGURE shows that the drive train furthermore comprises a clutch K0, in particular a so-called K0 clutch, between the internal combustion engine VKM and the electric motor EM. When the vehicle is being operated by the internal combustion engine VKM, during the setting of the overrun torque via the freewheel-free higher forward gear 2G by the electric motor EM operating as a generator in order to recover energy, said internal combustion engine can be decoupled and/or switched off by opening the clutch K0 and/or coupled and/or started again when the vehicle changes from overrun operation into traction operation by closing the clutch K0. Insofar as when the vehicle is being operated by the internal combustion engine, said internal combustion engine VKM is further operated and only decoupled by opening the clutch K0 during the setting of the overrun torque via the freewheel-free higher forward gear 2G by the electric motor EM operating as a generator in order to recover energy, the speed of the internal combustion engine VKM can, for example, be held and/or set at a speed corresponding to the freewheel-connected low forward gear 1GF, for example, during the setting of the overrun torque via the freewheel-free higher forward gear 2G by the electric motor EM operating as a generator in order to recover energy.

LIST OF REFERENCE SYMBOLS

VKM Internal combustion engine
G Transmission
EM Electric motor
K0 K0 clutch
1GF freewheel-connected low, in particular first, forward gear that only transmits traction torque
2G freewheel-free higher, in particular second, forward gear

The invention claimed is:
1. A method for controlling a drive train of a hybrid vehicle having an internal combustion engine, an electric motor to be operated as a motor or in generator mode, and a transmission, and wherein energy is recovered by the electric motor being in generator mode when the vehicle is in overrun operation, the method comprising:
providing the transmission with a freewheel-connected low forward gear that only transmits a traction torque and at least one freewheel-free higher forward gear; and
when the freewheel-connected low forward gear is engaged and the vehicle transitions into overrun operation, or
when a driver of the vehicle requests a transition of the vehicle into overrun operation by selecting the freewheel-connected low forward gear;
setting an overrun torque via the freewheel-free higher forward gear by operating the electric motor in generator mode in order to recover energy, with the overrun torque being substantially equal to an overrun torque of a freewheel-free embodiment of the freewheel-connected low forward gear.
2. The method according to claim 1, wherein the freewheel-connected low forward gear is a first forward gear and the freewheel-free higher forward gear is a second forward gear of the transmission.
3. The method according to claim 1, wherein the transmission is an automated manual transmission, wherein gear changes are effected manually by the driver of the vehicle through a one-touch mode.
4. The method according to claim 1, which comprises:
when the vehicle transitions into the overrun operation in the freewheel-connected low forward gear, shifting into the freewheel-free higher forward gear and setting an overrun torque via the freewheel-free higher forward gear by the electric motor operating in generator mode to thereby recover energy, with the overrun torque corresponding substantially to an overrun torque of a freewheel-free embodiment of the freewheel-connected low forward gear; or
when the driver of the vehicle requests a transition of the vehicle into the overrun operation by selecting the freewheel-connected low forward gear, retaining the freewheel-free higher forward gear and setting an overrun torque via the freewheel-free higher forward gear by the electric motor operating in generator mode to thereby recover energy, with the overrun torque corresponding substantially to an overrun torque of a freewheel-free embodiment of the freewheel-connected low forward gear.
5. The method according to claim 1, which comprises, when an overrun torque is set via the freewheel-free higher forward gear by the electric motor operating in the generator mode to recover energy, which overrun torque corresponds substantially to an overrun torque of the freewheel-free embodiment of the freewheel-connected low forward gear, displaying the freewheel-connected low forward gear as a target gear.
6. The method according to claim 1, which comprises, when the vehicle changes from overrun operation back into traction operation, shifting from the freewheel-free higher forward gear into the freewheel-connected low forward gear.

7. The method according to claim 1, wherein the drive train has a clutch between the internal combustion engine and the electric motor, and the method further comprises:
when the vehicle is being operated by the internal combustion engine, opening the clutch for decoupling the internal combustion engine or switching off the internal combustion engine during the setting of the overrun torque via the freewheel-free higher forward gear by the electric motor operating in generator mode in order to recover energy, and closing the clutch for coupling the internal combustion engine or restarting the internal combustion engine when the vehicle changes from the overrun operation to the traction operation.

8. The method according to claim 7, wherein, when the vehicle is being operated by the internal combustion engine, continuing an operation of the internal combustion engine during the setting of the overrun torque via the freewheel-free higher forward gear by the electric motor operating in generator mode, but decoupling the internal combustion engine by opening the clutch.

9. The method according to claim 1, which comprises holding or setting a speed of the internal combustion engine at a speed corresponding to the freewheel-connected low forward gear when the vehicle is being operated by the internal combustion engine during the setting of the overrun torque via the freewheel-free higher forward gear by the electric motor operating in generator mode or when the vehicle is changed from overrun operation to traction operation.

10. The method according to claim 1, which comprises, when the freewheel-connected low forward gear is selected or shifted, in addition to the freewheel-connected low forward gear, pre-engaging the freewheel-free higher forward gear.

* * * * *